United States Patent
Vinicombe et al.

(10) Patent No.: US 11,960,846 B2
(45) Date of Patent: Apr. 16, 2024

(54) EMBEDDING INFERENCE

(71) Applicant: Pinterest, Inc., San Francisco, CA (US)

(72) Inventors: Heath Vinicombe, San Francisco, CA (US); Chenyi Li, San Francisco, CA (US); Yunsong Guo, Santa Clara, CA (US); Yu Liu, Los Altos, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 18/315,426

(22) Filed: May 10, 2023

(65) Prior Publication Data

US 2023/0281395 A1 Sep. 7, 2023

Related U.S. Application Data

(62) Division of application No. 16/568,932, filed on Sep. 12, 2019, now Pat. No. 11,797,775.

(51) Int. Cl.
*G06F 40/30* (2020.01)
*G06N 7/00* (2023.01)

(52) U.S. Cl.
CPC .............. *G06F 40/30* (2020.01); *G06N 7/00* (2013.01)

(58) Field of Classification Search
CPC ....................................................... G06F 40/30
See application file for complete search history.

(56) References Cited

U.S. PATENT DOCUMENTS

| | | | |
|---|---|---|---|
| 10,496,752 B1* | 12/2019 | Crossley | G06N 20/00 |
| 10,509,863 B1* | 12/2019 | Arfa | G06F 40/295 |
| 10,558,759 B1* | 2/2020 | Arfa | G06F 40/30 |
| 10,803,248 B1* | 10/2020 | Arfa | G06N 20/00 |
| 10,956,522 B1* | 3/2021 | Jha | G06F 16/355 |
| 11,030,539 B1* | 6/2021 | Arfa | G06F 40/295 |
| 11,182,806 B1* | 11/2021 | Arfa | G06Q 30/0201 |
| 2017/0017638 A1* | 1/2017 | Satyavarta | G06F 40/253 |
| 2019/0138615 A1* | 5/2019 | Huh | G06F 16/953 |
| 2020/0050638 A1* | 2/2020 | Hancock | G06F 16/90344 |
| 2020/0117738 A1* | 4/2020 | Hassanzadeh | G06V 20/62 |
| 2020/0192921 A1* | 6/2020 | Satterfield | G06F 16/3323 |
| 2020/0342016 A1* | 10/2020 | Morris | G06F 40/295 |
| 2021/0157983 A1* | 5/2021 | Kalluri | G06F 40/216 |
| 2021/0182328 A1* | 6/2021 | Rollings | G06F 40/30 |
| 2023/0281395 A1* | 9/2023 | Vinicombe | G06N 7/00 704/9 |

\* cited by examiner

*Primary Examiner* — Kevin Ky
(74) *Attorney, Agent, or Firm* — Athorus, PLLC

(57) ABSTRACT

Systems and methods are presented for inferring an embedding vector of an item of a first type into the embedding space. Upon receiving a first time for which there is no embedding vector, documents of a document corpus that include (co-occurrence) both the received item and other items of the same type are identified. Of those other items that have embedding vectors, those embedding vectors are retrieved and averaged. The resulting averaged embedding vector is established as an inferred embedding vector for the received item.

13 Claims, 8 Drawing Sheets

EMBEDDING INFERENCE

CROSS-REFERENCE TO PRIOR APPLICATIONS

This application is a divisional application of and claims priority to U.S. application Ser. No. 16/568,932, filed on Sep. 12, 2019 and entitled "Determining Embedding Vectors for an Unmapped Content Item Using Embedding Inference," which is hereby incorporated by reference herein in its entirety.

BACKGROUND

Content embedding is a collective name for a set of modeling and feature learning techniques where input data is analyzed and processed, resulting in a vector (array) of real numbers. The resulting vector is referred to as an embedding vector for the input data and each element of the embedding vector includes a value corresponding to some feature or aspect of the given input data. In general, an embedding vector uniquely describes the input data from which the embedding vector was generated.

The various elements of an embedding vector define a multi-dimensional space, and the values within each element of a given embedding vector collectively define a point on the surface of the multi-dimensional space. One key function of the processing of input data is that, for two input items that are closely related, the values of their corresponding embedding vectors will be such that their respective locations in the multi-dimensional space will be similarly close.

Embedding vectors are generated by embedding vector generators. As suggested above, an embedding vector generator is provided with input data and, in response, processes and analyzes the input data, resulting in the generation of a corresponding embedding vector. This processing and analysis is referred to as convolution, and the convolution includes, by way of illustration and not limitation, comparisons, mathematical operations, aggregations, translations, normalizations, filtering, and the like, all to transform the input data into an array of real values, with each value representing some feature of the input data. Often, though not exclusively, embedding vector generators are neural networks specifically trained to generate embedding vectors for input data.

Embedding vector generators are type specific. In short, this means that embedding vector generators require a specific type of input data or input item to produce a desired and meaningful result, i.e., an embedding vector that accurately reflects the elements of the input data. Thus, an embedding vector generator that is trained to generate embedding vectors for text-based input data will not generate meaningful results if given an image as input data. More generally, embedding vectors generated by a first embedding vector generator cannot be reasonably compared to embedding vectors generated by a second embedding vector generator.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" regarding multiple items should be viewed as meaning either or both items.

Regarding embedding vectors, typically, each of the various elements of embedding vectors is a floating-point value, e.g., a 32- or 64-bit floating point value that represents some aspect of the input data as determined by an embedding vector generator. In some instances, however, all or some of the values may be integer values (signed or unsigned), and in some instances the values may be binary values. A typical length of an embedding vector, i.e., the number of elements, can vary greatly though, in various embodiments, an embedding vector comprises 128 elements, each element comprising a 32-bit signed floating-point value.

As indicated above, the values of an embedding vector serve to project the input data into a multi-dimensional space, as defined by the embedding vector generator. Indeed, turning to FIG. 1, FIG. 1 is a block diagram 100 illustrating exemplary generation of embedding vectors for various input images and projecting the generated embedding vectors into a corresponding multi-dimensional space, in accordance with aspects of the disclosed subject matter.

Figure 1:
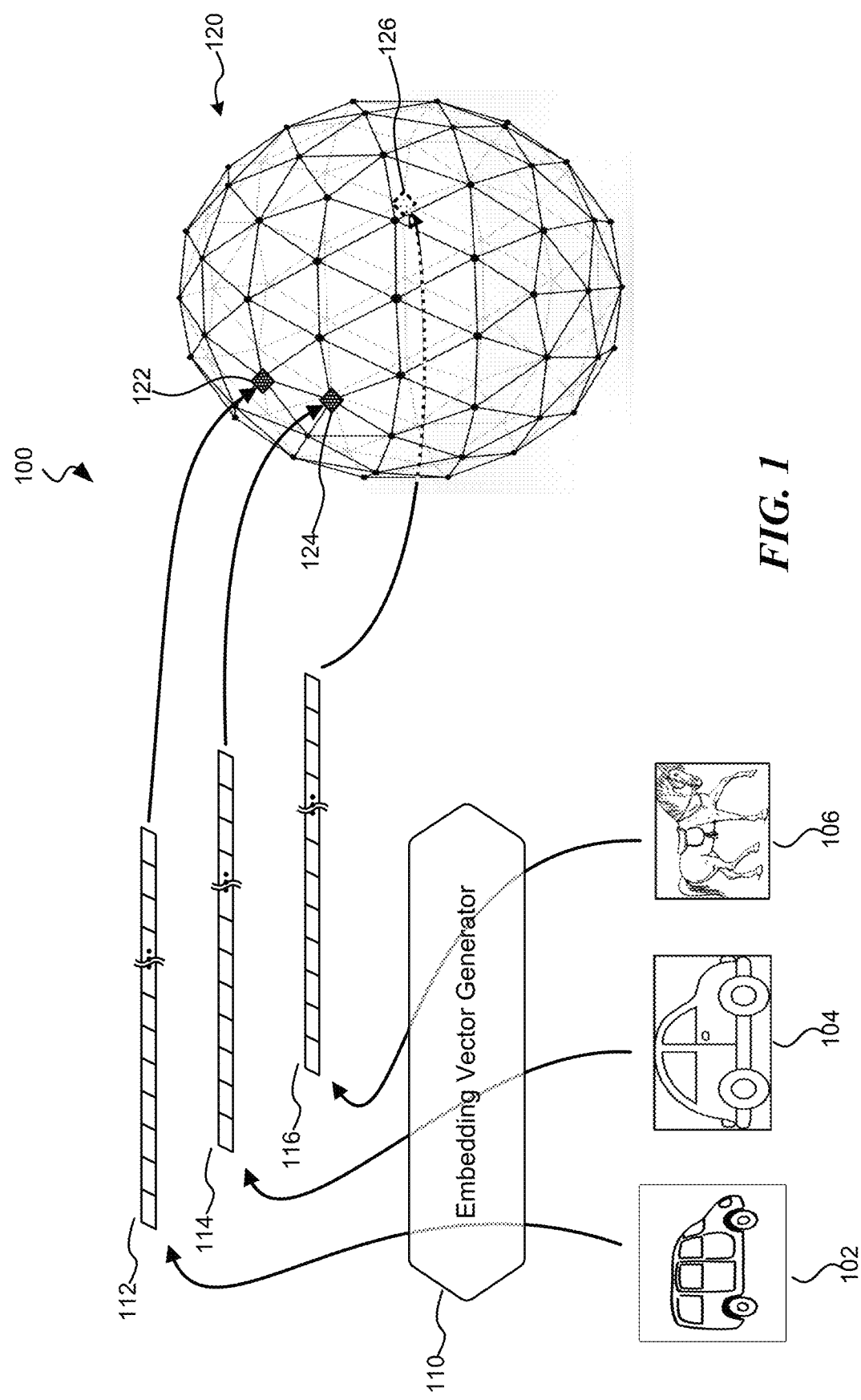
FIG. 1 is a block diagram illustrating the exemplary generation of embedding vectors for various input images and projecting the generated embedding vectors into a corresponding multi-dimensional space, in accordance with aspects of the disclosed subject matter.

As shown in FIG. 1, images 102-106 are processed by an embedding vector generator 110 resulting in corresponding embedding vectors 112-116. These embedding vectors are then projected or mapped into the multi-dimensional space 120, as illustrated by locations 122-126. As mentioned above, the multi-dimensional space 120 is defined by the elements of the embedding vectors—as determined and generated by the embedding vector generator 110. As can be seen, locations 122 and 124 are relatively close to each other in the multi-dimensional space 120, especially in comparison to location 126. Indeed, in the multi-dimensional space, relative measurements can be made to determine "closeness" or similarity. Of course, the closeness of locations 122 and 124 reflect the closeness of images 102 and 104 (images of automobiles), especially in comparison to image 106 (an image of a horse).

While generating embedding vectors for content items of the same type enables the use of automated comparisons (in the multi-dimensional space) to determine the relative similarity between two content items, there are times that an embedding vector for a content item is not available. Indeed, there are publicly available embedding vector generators that are readily accessible and provide good results. Unfortunately, there are instances in which the publicly available embedding vector generators cannot provide an embedding vector for an item. For example, publicly available embedding vector generators for text-based content do not generate embedding vectors for all words or terms. When an online service receives a word or term for which an embedding vector is not available, automated analysis and comparisons are thwarted. Aspects of the disclosed subject matter are directed to inferring an embedding vector for a target item in circumstances where an embedding vector for the target item is not available from an embedding vector generator.

In addition to the above scenario, while meaningful comparisons and manipulations may be made between items of the same type in a multi-dimensional space based on embedding vectors generated by the same embedding vector generator, a difficulty arises in making comparisons between items of different types. Indeed, in regard to the example of FIG. 1, the question may arise, how relative/similar/close is the term "automobile" to image 102 or image 104 (both images of automobiles)? Being type-specific (for images), embedding vector generator 110 is not configured to generate a meaningful embedding vector for the term "automobile" and, therefore, similarity measurements cannot be made within the multi-dimensional space 120. This and numerous other related scenarios is the dilemma of online services: a first user posts an image (e.g., image 102) to an area of the online service and a second user associates a text comment (e.g., "automobile") to the image and the online service wants to determine (through automated means) how relevant the text comment is to the posted image. Aspects of the disclosed subject matter are further directed to determining an inferred embedding vector for a target content item of a first content type into the multi-dimensional embedding space of a second content type.

Figure 2:
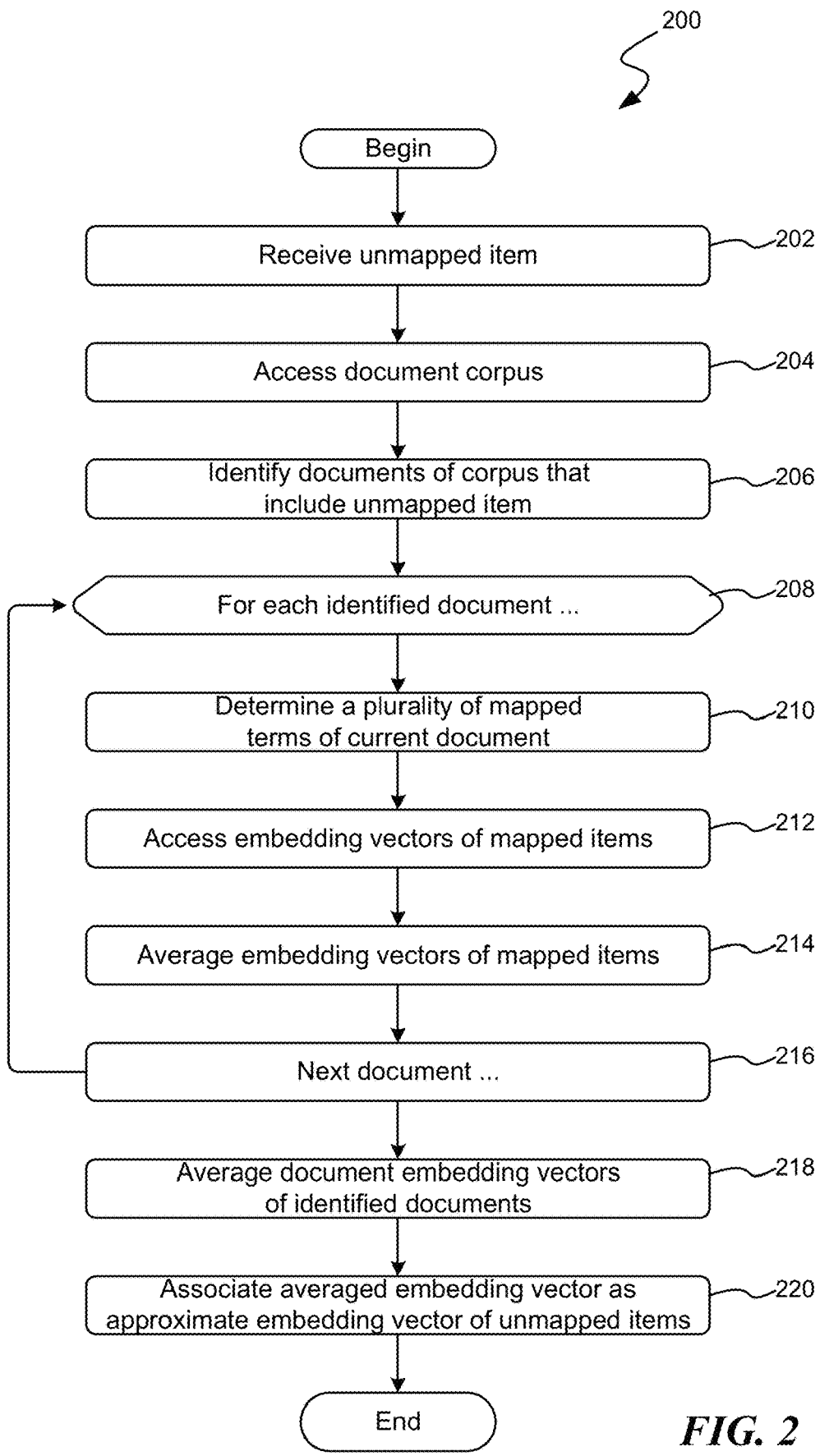
FIG. 2 is a flow diagram illustrating a first exemplary routine 200 for determining an inferred embedding vector for a target item of a first content type, in accordance with aspects of the disclosed subject matter.

Turning to FIG. 2, this figure is directed to a flow diagram illustrating a first exemplary routine 200 for determining an inferred embedding vector for a target item of a first content type, in accordance with aspects of the disclosed subject matter. Of course, with an inferred embedding vector, meaningful measurements and comparisons can be made in the multi-dimensional embedding space of the target content type between the target item and other items of the target content type.

Beginning at block 202, an unmapped item is received. By way of definition, an unmapped item is a content item for which an embedding vector is not available from an embedding vector generator. As mentioned above, there may be various reasons that there is no embedding vector for the unmapped, target item, including but not limited to various limitations of a publicly available embedding vector generator of the target item's type. In contrast to an unmapped item, a mapped item is a content item of that first type that has an associated embedding vector (of the first type's embedding space).

At block 204, a document corpus is accessed. According to aspects of the disclosed subject matter, the document corpus includes content collections, or "documents," where these documents will often (though not exclusively) include mixed content types, including items of an item type that may or may not be processed by an embedding vector generator.

At block 206, documents of the document corpus that include the unmapped item are identified. Typically, though not exclusively, this identification is made through one or more indices or reverse indices that indicate which documents include the unmapped item.

At block 208 an iteration is begun to iterate through each of the identified documents. As part of this iteration, at block 210 the mapped terms found within a currently iterated document are identified. At block 212, embedding vectors for the mapped items of the currently iterated document are accessed.

At block 214, with the embedding vectors of the mapped items of the current iterated document, these embedding vectors are averaged. According to various aspects of the disclosed subject matter, averaging embedding vectors comprises determining a mean or average value across each dimension or element of the various identified embedding vectors. For example, the values of the first elements of each identified embedding vector are averaged, and that averaged or mean value becomes the value of the first element of the resulting averaged embedding vector for the currently iterated document.

At block 216, if there are additional documents identified for processing, the routine 200 returns to block 208 to select a next document and the iteration continues. Alternatively, if there are no additional documents, the routine 200 proceeds to block 218.

At block 218, the averaged embedding vectors for the various identified documents are, themselves, averaged. As above, this averaging typically involves averaging the values of the elements across the embedding vectors. The result of this averaging is an averaged embedding vector for all identified documents that includes the unmapped content item. At block 220, this averaged embedding vector for all identified documents is associated with the unmapped item as its inferred or approximate embedding vector. Thereafter, routine 200 terminates.

While a per-document averaging of embedding vectors of mapped items is discussed above, in various embodiments of the disclosed subject matter the frequency and/or importance of a given mapped term to its document may be used as a weighting factor in the averaging process. This weighting recognizes that those mapped items whose apparent importance, frequent and/or common use often has a strong correlation to the overall theme or topic of the document, and factors in that importance to the averages. While frequency is a matter of counting, importance can be determined according to various measures, including a term frequency/inverse document frequency (TF/IDF) measurement. Indeed, in various embodiments, only those content items whose TF/IDF measure meets or exceeds a predetermined threshold are included as the content items for a given document.

Figure 3:
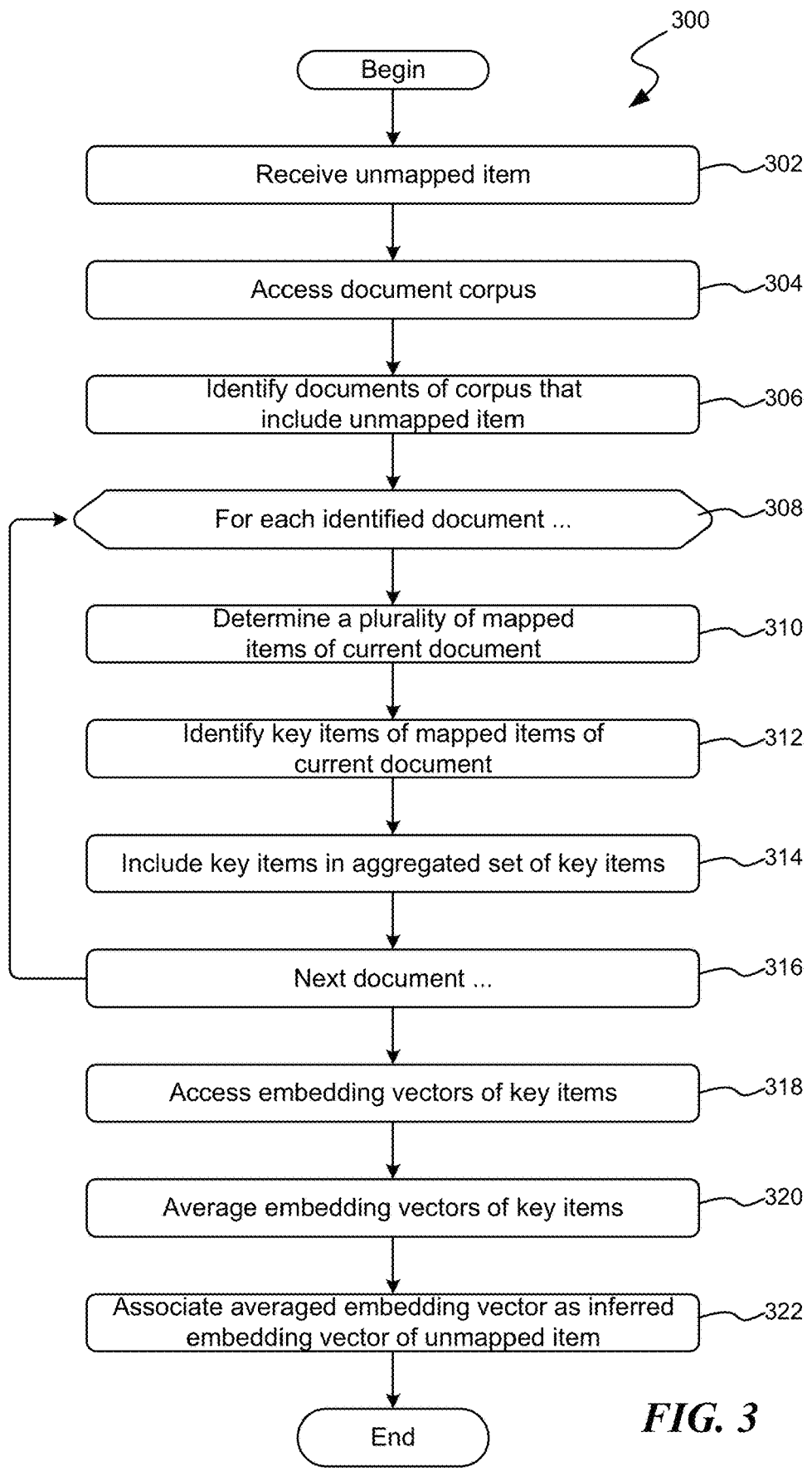
FIG. 3 is a flow diagram illustrating a second, alternative routine for determining an inferred embedding vector for an unmapped item the multi-dimensional embedding space of that item's type, in accordance with aspects of the disclosed subject matter.

As described above, routine 200 sets forth a method of averaging the embedding vectors of the mapped items of documents (which may optionally include weighting the embedding vectors that are averaged) to produce an averaged embedding vector for a document, and then averaging the averaged embedding vectors of the documents. FIG. 3 sets forth a flow diagram illustrating a second, alternative routine 300 for determining an inferred embedding vector for an unmapped item in the multi-dimensional embedding space of that item's type, in accordance with aspects of the disclosed subject matter.

Beginning at block 302, an unmapped item is received. At block 304, a document corpus is accessed. As with routine 200, for routine 300 the document corpus includes content collections or "documents," where these documents will often (though not exclusively) include mixed content types.

At block 306, documents in the document corpus that include the unmapped item are identified. Typically, though not exclusively, the identification of these documents is based on one or more indices and/or reverse indices. At block 308, an iteration is begun to iterate through each of the identified documents.

As a first part of each iteration, at block 310, mapped items of a currently iterated document are identified. At block 312, of the mapped terms, key items are identified. Key items are those items (of the mapped items) that are determined to be important to the source document (i.e., the currently iterated document). According to various embodiments of the disclosed subject matter, key items may be identified through variety of techniques and/or criteria including, but not limited to, a term frequency/inverse document frequency (TF/IDF) analysis. In this embodiment, those mapped items having a threshold TF/IDF score are then identified as the key items for the currently iterated document.

At block 314, the key items of the currently iterated document are added to an aggregated set of key items. At block 316, if there are additional documents to process, the routine 300 returns to block 308 to continue the iteration. Alternatively, if each of the identified documents has been processed, the routine 300 proceeds to block 318.

At block 318, embedding vectors associated with the key items of all of the documents (as found in the aggregated set of key items) are accessed. At block 320 the embedding vectors of the key items are averaged. As above, this averaging is conducted on values across the various elements of the embedding vectors. Additionally, this averaging may take into consideration the importance of any given item (as based on a score used in identifying the key items) such that the most important or key items are weighted more heavily in the averaging process. The result of the averaging is an averaged embedding vector for the key items. At block 322, this averaged embedding vector is associated with the unmapped item. Thereafter, the routine 300 terminates.

While routine 300 discloses the use of key items of documents, it should be appreciated that in an alternative embodiment, all mapped items of the identified documents may be included in the aggregated set of terms and subsequently used to determine the averaged embedding vector for the unmapped item. Weightings based on importance and/or frequency of occurrence throughout the documents, including importance based on TF/IDF scores, may be applied to the values of some embedding vectors of mapped items during the averaging process.

Figure 4:
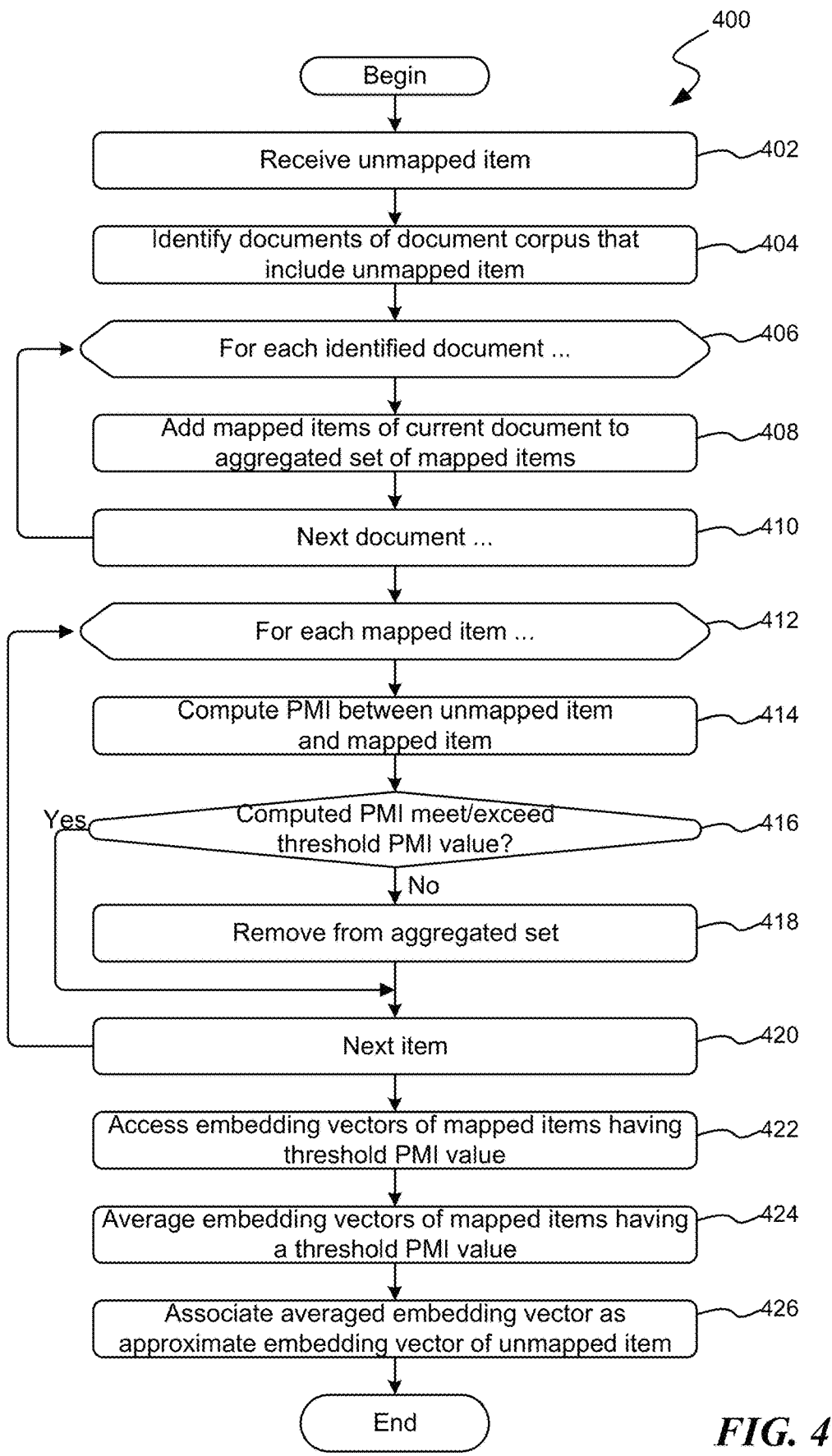
FIG. 4 is a flow diagram illustrating a third, alternative routine for determining an inferred embedding vector for an unmapped item in the multi-dimensional embedding space of that item's type, in accordance with aspects of the disclosed subject matter.

Turning to FIG. 4, FIG. 4 is a flow diagram illustrating a third, alternative routine for determining an inferred embedding vector for an unmapped item in the multi-dimensional embedding space of that item's type, in accordance with aspects of the disclosed subject matter. Beginning at block 402, an unmapped content item is received. At block 404, documents within a document corpus that include the unmapped content item are identified.

At block 406, an iteration is begun to iterate through each of the identified documents, i.e., those documents that include the unmapped content item. As part of the iteration, at block 408, all mapped content items within the currently iterated document are added to an aggregated set of mapped items for subsequent analysis. After adding the mapped content items of the currently iterated document to the aggregated set of mapped items, at block 410, if there are additional documents to process the routine 400 returns to block 406 to process another document. Alternatively, if all documents that include the unmapped content item have been processed, the routine 400 proceeds to block 412.

At block 412, another iteration is begun to iterate through the mapped content items in the aggregated set of mapped items. With regard to a currently iterated mapped content item, and in contrast to routine 200 and 300 above, at block 414 a pointwise mutual information (PMI) score is determined between the currently iterated mapped content item and the unmapped item.

As those skilled in the art will appreciate, PMI is generally described as a measure of association between two objects. According to aspects of the disclosed subject matter, in this present case the PMI score is a measure of co-occurrence of the mapped content items with regard to the unmapped item. This PMI measure is determined according to the formula:

$$\frac{|A \cap B|}{|A| \cdot |B|}$$

where $|A \cap B|$ corresponds to the number of documents of the document corpus in which both the unmapped item A and the mapped item (B) are found, $|A|$ corresponds to the number of documents of the document corpus in which the unmapped item A is found, and $|B|$ corresponds to the number of documents of the document corpus in which the unmapped item B is found.

After determining the PMI score between the currently iterated mapped item and the unmapped item, at block 416 a determination is made as to whether the PMI score for the currently iterated mapped items meets or exceeds at least a threshold PMI score. If the PMI score for the currently iterated mapped content item fails to at least meet the threshold PMI score, at block 418 the currently iterated mapped item is removed from the aggregated set of mapped items. Thereafter, or if the PMI score for the currently iterated mapped content item at least meets the threshold PMI score, at block 420 if there are additional mapped items in the aggregated set to process, the routine 400 returns to block 412. Alternatively, if all mapped items in the aggregated set have been processed, the routine 400 proceeds to block 422.

At block 422, embedding vectors for the mapped items remaining in the aggregated set of items having at least a threshold PMI score are accessed. At block 424, the embedding vectors of the mapped items are averaged. Weighting values may be determined and applied to the various embedding vectors according to corresponding PMI scores, with those mapped items that have higher PMI scores being weighted more strongly than those will lesser scores.

At block 426, the averaged embedding vector is associated as an inferred embedding vector for the unmapped item. Thereafter, routine 400 terminates.

Figure 5:
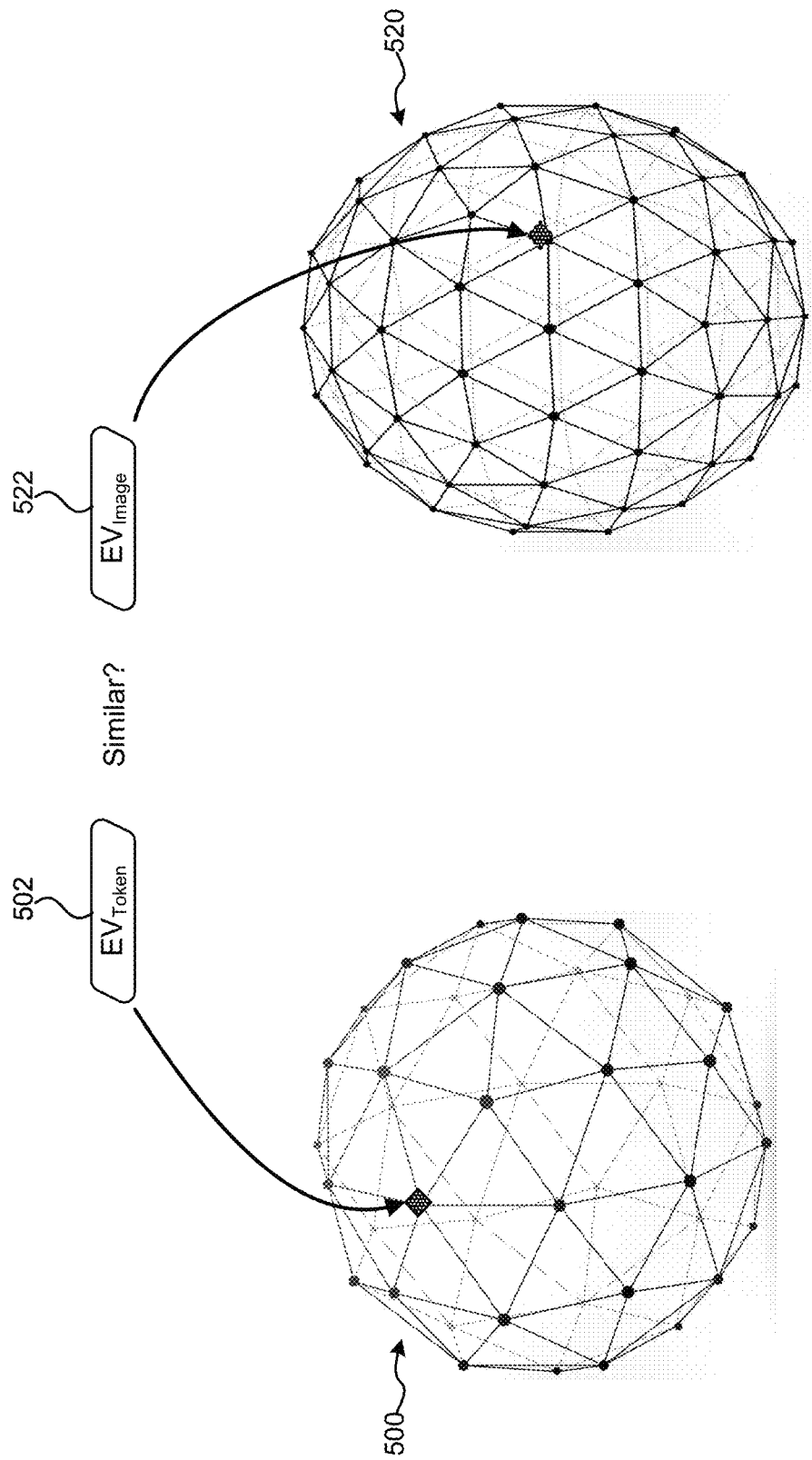
FIG. 5 is a block diagram illustrating the projection of embedding vectors of two types into corresponding multi-dimensional spaces, in accordance with aspects of the disclosed subject matter.

While routines 200, 300 and 400 are directed to inferring an embedding vector for an unmapped item, a similar question arises: even if an embedding vector can be determined for a new item, how does one infer a similarity score between an item in a first embedding space and a second item in another embedding space? Indeed, FIG. 5 is a block diagram 500 illustrating the projection of embedding vectors of items of two distinct types into corresponding multi-dimensional spaces, in accordance with aspects of the disclosed subject matter. As shown in FIG. 5 and by way of example, an embedding vector, such as $EV_{token}$ 502, that is generated for a text-based token or term can be projected or mapped into a text-based embedding space 500. Similarly, an embedding vector, such as $EV_{image}$ 522, that is generated for a digital image can be projected into an image-based embedding space 520. Clearly, these two embedding spaces are distinct and direct similarity comparisons cannot be made. However, according to aspects of the disclosed subject matter, a similarity score between the two embedding vectors of distinct types can be made based on established, related information, as set forth in routine 600 of FIG. 6.

Figure 6:
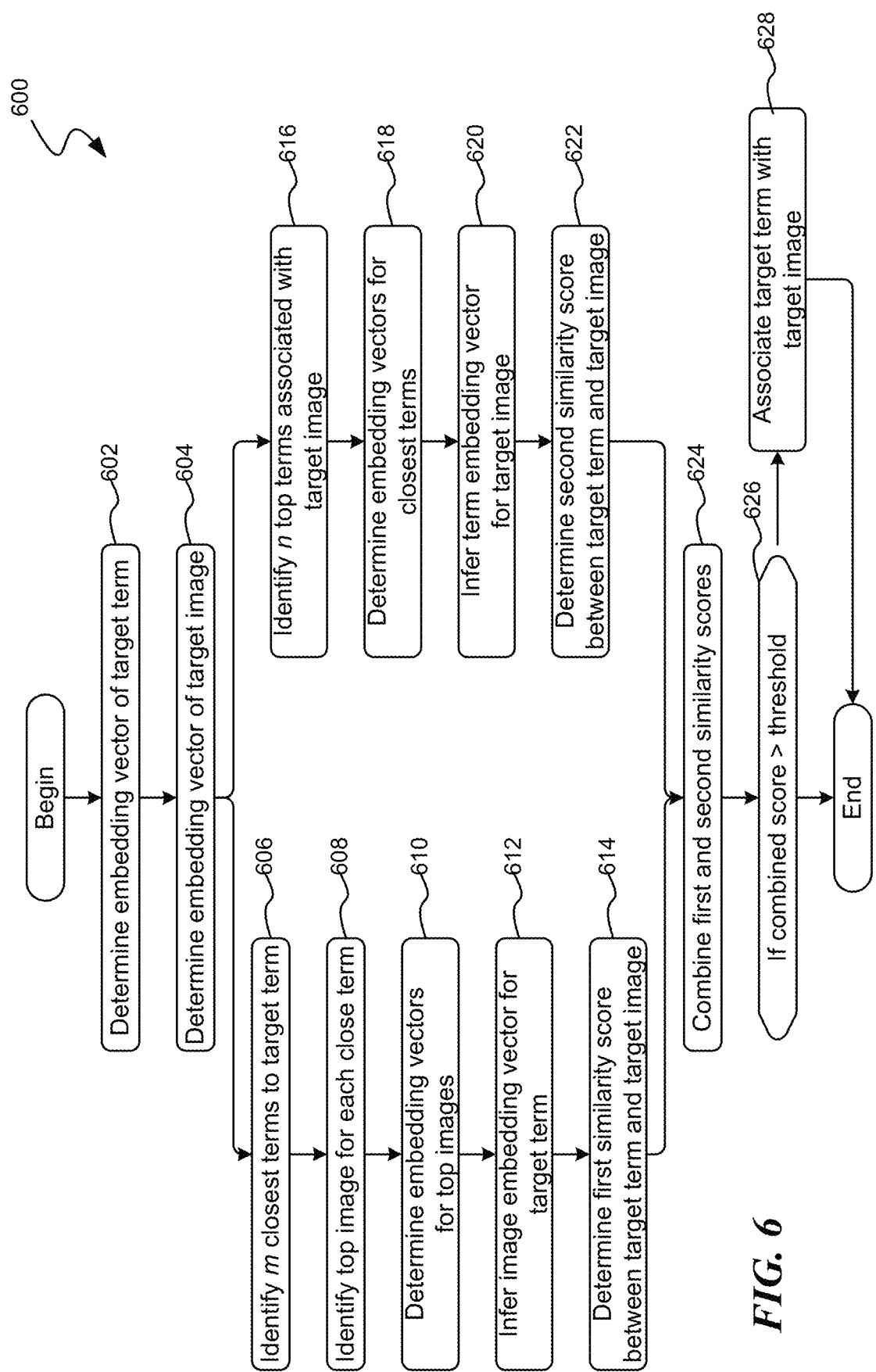
FIG. 6 is a flow diagram illustrating an exemplary routine for determining an inferred similarity of an embedding vector of an item of a first type to an embedding vector of an item of a second type, in accordance with aspects of the disclosed subject matter.

Turning to FIG. 6, FIG. 6 is a flow diagram illustrating an exemplary routine 600 for determining an inferred similarity of an embedding vector of an item of a first type to an embedding vector of an item of a second type, in accordance with aspects of the disclosed subject matter. Additionally, while routine 600 is described in the context of a text-based term and an image, it should be appreciated that the disclosed subject matter may be suitably applied to any two distinct types of content, as set forth below.

Beginning at block 602, an embedding vector, e.g., $EV_{term}$ 502, for a target term is determined. As suggested above, the embedding vector may be determined or generated according to a proprietary embedding vector generator or by way of a publicly available embedding vector generator. In the case of text-based content, services like fasttext.com and conceptnet.io are examples of publicly available text-based embedding vector generators. Of course, an inferred embedding vector, as determined by any one of routines 200, 300 or 400 set forth above, may also be used.

At block 604, an embedding vector, e.g., $EV_{image}$ 504, for a target image is also determined. As with text-based embedding vector generators, proprietary or publicly available embedding vector generators may be used. An inferred embedding vector for the image, as determined by any one of routines 200, 300 or 400 set forth above, may also be used.

At block 606, a set of the top m closest terms to the target term are identified, with m corresponding to some predetermined or configurable number suitable for processing. In various, non-limiting embodiments, m is predetermined to be 20.

According to various aspects of the disclosed subject matter, the identification of these m closest terms is made by projecting the embedding vectors of a corpus of similarly-typed terms, including the target term, into the text-based embedding space, e.g. text-based embedding space 510. With the corpus of terms projected into the text-based embedding space 510, a cosine similarity operation can be performed to identify the closeness of two projected terms within the space—where one of the projected terms is the target term. Those m terms whose embedding vectors are projected (or mapped) most closely to the projected target term are identified as the closest m terms. In accordance with aspects of the disclosed subject matter, various techniques such as location sensitive hashing, or LSH, may be utilized to limit the number of comparisons that must be made to identify the closest m terms to the target term to a more manageable number.

At block 608, for each of the top m terms identified in block 606, and using one or more mapping tables (or some other established correlation/association) showing established similarity measures between terms and images of a document corpus, the top-most related image for each term is identified, resulting in a set of m related images, recognizing that one image may be counted multiple times if two or more terms are associated with the same image.

At block 610, embedding vectors (in the image embedding space) are accessed or determined for each of the m related images. At block 612, an inferred embedding vector (in the image embedding vector space) is generated from the m embedding vectors of the set of m related images. This inferred embedding vector is determined according to an average of the m embedding vectors. At block 614, with this inferred image embedding vector for the target term, a first similarity is determined for the target item/target image pair. This first similarity score is determined according to the similarity of the inferred embedding vector for the target term and the embedding vector $EV_{image}$ 504 of the target image. A cosine similarity measure may be made between these two embedding vectors in the image embedding space.

At block 616, the top n terms associated with the target image are identified. As in the case of the definition of m above, n corresponding to some predetermined or configurable number suitable for processing. In various, non-limiting embodiments, n is predetermined to be 25. These top n terms associated with the target image are identified according to one or more mapping tables illustrating established associations of terms and images as found in the document corpus. After identifying the top n terms associated with the target image, at block 618 an embedding vector for each of the terms is identified or accessed, resulting in n embedding vectors in the text-based embedding space.

At block 620, a text-based embedding vector is inferred for the image according to the n embedding vectors. As above with other "inferred" embedding vectors, this inference is made by averaging the embedding vectors of the top n terms associated with the target image. Weightings may be used to favor terms that are more strongly associated or frequently associated with the target image.

At block 622, a second similarity score is determined. This second similarity score is determined according to the similarity of the inferred text-based embedding vector for the target image and the embedding vector, e.g., $EV_{term}$ 502, of the target term. Again, a cosine similarity measure can be used to determine the similarity between the two embedding vectors in the text-based embedding space.

With the two similarity scores, at block 624 these similarity scores are combined to produce an inferred similarity score between the target term and the target image. Combining the two scores may be made according to various criteria including, by way of illustration and not limitation, an average of the two scores, a weighted average of the two similarity scores, established heuristics for normalizing and combining the scores, and the like.

Optionally, at block 626, if the overall, combined similarity score is greater than a predetermined threshold, routine 600 proceeds to block 628. At block 628, the target term and the target image are included within the one or more mapping tables as being associated, relevant, and/or related to each other. Thereafter, or if a similarity threshold is not met, the routine 600 terminates.

Regarding routines 200, 300, 400 and 600, while these routines are expressed as discrete, descriptive steps, these steps should be viewed as being logical in nature and may or may not correspond to any specific actual and/or discrete execution steps of a given implementation. Also, the order in which these steps are presented in the various routines, unless otherwise indicated, should not be construed as the only or best order in which the steps may be carried out. Moreover, in some instances, some of these steps may be combined and/or omitted. Optimizations of routines may be carried out without modifying the underlying functionality described herein. Those skilled in the art will recognize that the logical presentation of steps is sufficiently instructive to carry out aspects of the claimed subject matter irrespective of any specific development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Similarly, while some routines may be expressed as completely linear processing, parallel processing (synchronous and/or asynchronous) of various elements of the routines may be made. Accordingly, the particular use of programming and/or implementation techniques and tools to implement a specific functionality should not be construed as limiting upon the disclosed subject matter.

Of course, while these routines include various novel features of the disclosed subject matter, other steps (not listed) may also be included and carried out in the execution of the subject matter set forth in these routines, some of which have been suggested above. Those skilled in the art will appreciate that the logical steps of these routines may be combined into, or be comprised of, multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device or other type of computer system described in relation to FIG. 8 below. Additionally, in various embodiments all or some of the various routines may also be embodied in executable hardware modules including, but not limited to, systems on chips (SoC's), codecs, specially designed processors, logic arrays and/or logic circuits, and the like.

As suggested above, these routines are typically embodied within executable code blocks and/or modules comprising routines, functions, looping structures, selectors and switches such as if-then and if-then-else statements, assignments, arithmetic computations, and the like. In execution, these various executable constructs configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single- or narrowly-purposed applications), online services and/or methods, these aspects may also be embodied as computer executable instructions stored by computer readable media, also referred to as computer readable storage media, which are articles of manufacture.

As those skilled in the art will recognize, computer readable media can host, store and/or reproduce computer executable instructions and data for later retrieval and/or execution. When the computer executable instructions that are hosted and/or stored on the computer readable storage devices are executed by a processor of a computing device or computing system, the execution thereof causes, configures and/or adapts the executing computing device or computer system to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver or transmit the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
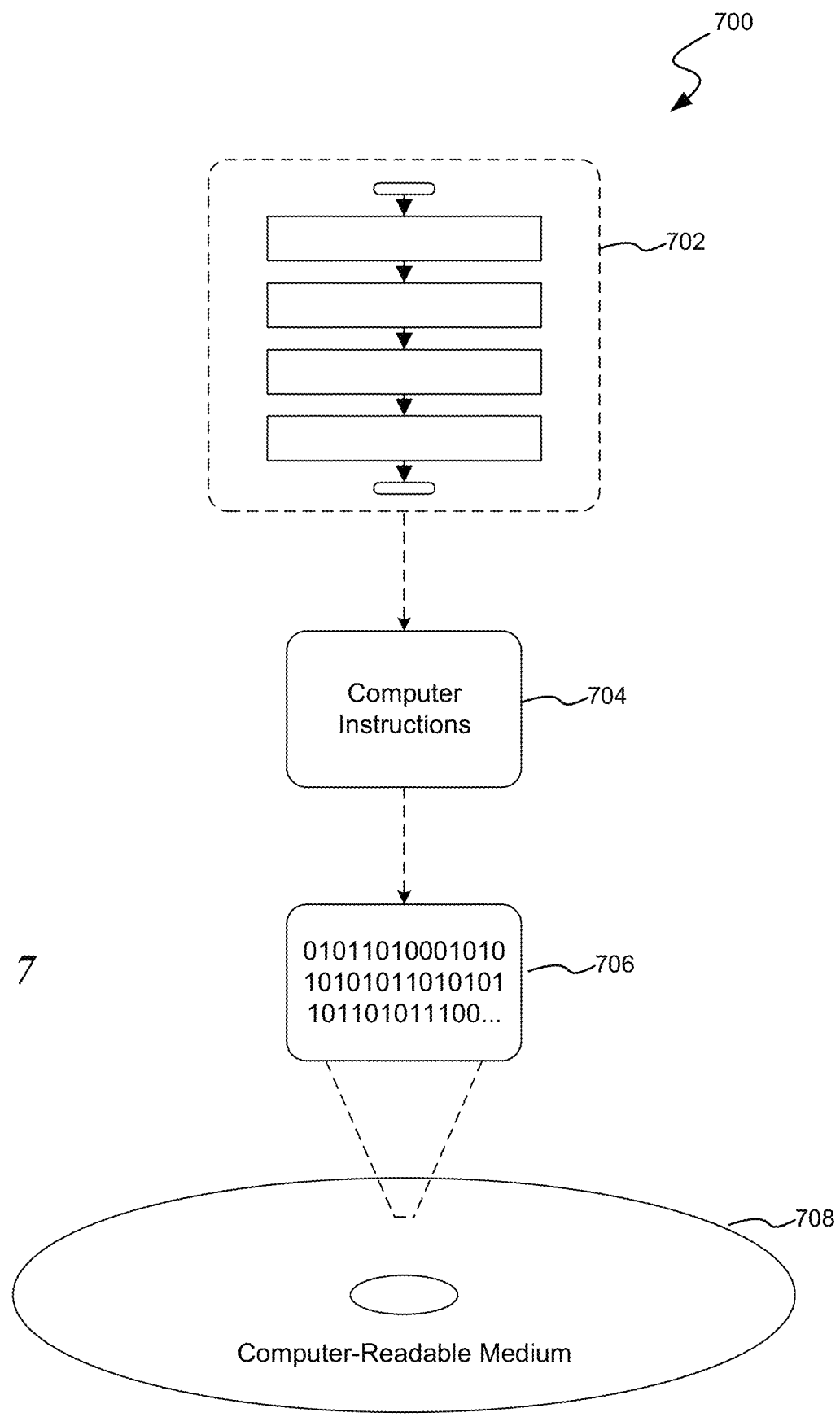
FIG. 7 is a block diagram illustrating an exemplary computer-readable medium with computer-executable instructions, formed in accordance with aspects of the disclosed subject matter.

Regarding computer readable media, FIG. 7 is a block diagram illustrating an exemplary computer readable medium 708 encoded with instructions 704 for inferring an embedding vector for an item of a first type into an embedding space of a second type, in accordance with aspects of the disclosed subject matter. More particularly, the illustrated, exemplary implementation 700 comprises a computer-readable medium 708 (e.g., a CD-R, DVD-R or a platter of a hard disk drive), on which is encoded computer-readable data 706. This computer-readable data 706, in turn, may comprise one or more sets of computer-executable instructions 704 configured to operate according to one or more of the methods and/or processes set forth herein. In one such embodiment 702, the computer-executable instructions 704 may be configured to perform a method, such as at least some of exemplary routines 200, 300, 400 and/or 600 as set forth above, for example. In another such embodiment, the computer-executable instructions 704 may be configured to implement various executable components on a computing system, such as at least some of the exemplary, executable components of computer system 800 of FIG. 8, as described below. Many configurations of computer readable media may be devised by those of ordinary skill in the art, which are configured to operate in accordance with the techniques presented herein.

Figure 8:
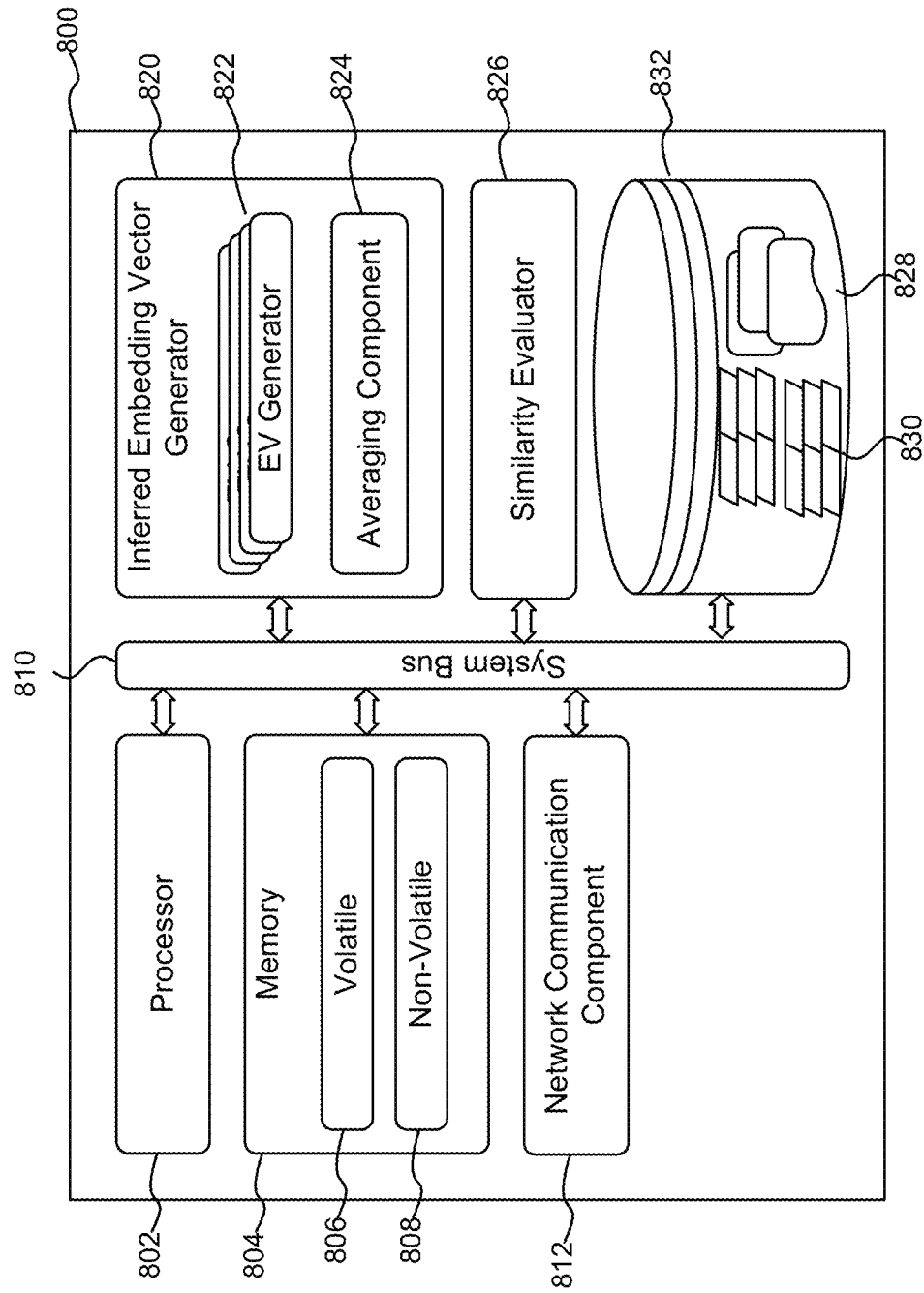
FIG. 8 is a block diagram illustrating an exemplary computer system suitable for implementing aspects of the disclosed subject matter.

Turning now to FIG. 8, FIG. 8 is a block diagram illustrating an exemplary computer system 800 suitably configured for inferring an embedding vector into the embedding space of a first type for a content of a second type, according to aspects of the disclosed subject matter. As those skilled in the art will readily appreciate, a typical computing system, such as computer system 800, includes one or more central processing units (or CPUs), such as CPU 802, and further includes at least one memory 804. The CPU 802 and memory 804, as well as other components of the computer system, are typically interconnected by way of a system bus 810.

As will be further appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally, RAM and CPU cache memory are examples of volatile memory 806, whereas ROM, solid-state memory devices, programmable logic arrays, EPROMs, memory storage devices, and/or memory cards are examples of non-volatile memory 808.

As will be further appreciated by those skilled in the art, in operation the CPU 802 executes instructions retrieved from the memory 804, from computer readable media, such as computer readable media 708 of FIG. 7, and/or other executable components in carrying out the various functions of the disclosed subject matter, particularly in regard to inferring an embedding vector in a embedding space of a first type of content for a content item of a second type. The CPU 802 may be comprised of any number of available processors such as single-processor, multi-processor, single-core units, and multi-core units, which are well known in the art.

Further still, the illustrated computer system 800 may also include a network communication interface 812 for interconnecting the computing system with other devices, computers and/or services over a computer network, including externally available embedding vector generators. The network communication interface 812, sometimes referred to as a network interface card or NIC, communicates over the network using one or more communication protocols via a physical/tangible (e.g., wired, optical fiber, etc.) connection, a wireless communication protocol such as WiFi or Bluetooth communication protocols, NFC, or a combination of both. As will be readily appreciated by those skilled in the art, a network communication interface, such as network communication component 812, is typically comprised of hardware and/or firmware components (and may also include or comprise executable software components) that transmit and receive digital and/or analog signals from other components and/or devices over a transmission medium (e.g., the network).

The exemplary computer system 800 further includes components that, in execution on the computing system, operate to determine or generate an inferred embedding vector in an embedding space of a first type of content for a content item of a second type. These additional, executable components include, by way of illustration and not limitation, an inferred embedding vector generator 820 that, in execution on the computer system 800, infers an embedding vector into an embedding space of a first type for a content item of a second type, as set forth above.

The inferred embedding vector generator 820 utilizes additional components, including optional proprietary embedding vector generators 822 suitable for generating embedding vectors, such as (by way of illustration and not limitation) a text-based embedding vector generator, an image embedding vector generator, and the like. These optional embedding vector generators are, as suggested above, type-specific in that each is specifically configured to generate an embedding vector for a corresponding type of content. Of course, third-party embedding vector generators may be utilized instead of any or all of the proprietary embedding vector generators.

The inferred embedding vector generator 820 also utilizes an averaging component 824. In execution on the computer system 800, the averaging component 824 takes, as input, a plurality of embedding vectors of the same type and determines an averaged embedding vector of that type. The averaging component 824 may further accept data that indicates importance and/or relevance that can be used to weight any or all of the inputted embedding vectors and/or elements of the embedding vectors during the averaging process discussed above.

Additionally, the additional executable components include a similarity evaluator 826. The similarity evaluator 826 is configured to determine an inferred similarity of an embedding vector of a first embedding space to an embedding vector of a second embedding space, as set forth above in regard to routine 600 of FIG. 6.

The computer system 800 further includes a data store 832. This data store stores a variety of data and information useful by the various executable components of the computer system, including a document corpus 830 and one or more indices 828 that include associations between a first embedding vector of a content item of a first type and a second embedding vector of a content item of a second type. This information is useful in identifying established associations (and relatedness) between the content items, which are then used to infer embedding vectors of a first type for content items of a second type, and/or determine similarity between an embedding vector of a content item of a first type and an embedding vector of a content item of a second type, as discussed above.

Regarding the various components of the exemplary computer system 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-readable medium bearing computer-executable instructions which, when executed by a processor on a computing system, carry out a method for inferring an embedding vector for a target content item of a target content type, the method comprising:

accessing document corpus information, the document corpus information describing a plurality of documents that include items of a plurality of content types including content items of the target content type;

identifying a set of documents of the document corpus that include the target content item according to the accessed document corpus information;

for each document of the identified set of documents that include the target content item, adding content items of the target content type within a current document to an aggregated set of content items;

for each content item of the target content type within the aggregated set of content items:

determining a pointwise mutual information (PMI) score for a current content item in view of the target content item; and if the PMI score for the current content item fails to at least meet a threshold PMI score for the target content item, removing the current content item from the aggregated set of content items;

accessing embedding vectors of the content items of the target content type remaining in the aggregated set of content items;

averaging the accessed embedding vectors; and associating the resulting averaged embedding vector with the target content item as an inferred embedding vector for the content item.

2. The computer-readable medium of claim 1, wherein the pointwise mutual information (PMI) score for a current content item is determined based on a formulation of a co-occurrence of the target content item and current given item in the documents of the document corpus.

3. The computer-readable medium of claim 2, wherein adding content items of the target content type within the current document to the aggregated set of content items comprises adding those content items of the target content type within the current document to the aggregated set of content items that have an associated embedding vector.

4. The computer-readable medium of claim 3, further comprising:

determining a weighting value for each of the content items according to the PMI scores with the target content item; and weighting the embedding vectors for the identified content items according to their PMI scores; and wherein averaging the accessed embedding vectors comprises averaging the weighted embedding vectors of the identified content items.

5. The computer-readable medium of claim 4, wherein the target content item is a text-based content item.

6. The computer-readable medium of claim 5, wherein the target content item is a text-based content item for which a text-based embedding vector is not available.

7. A computer system for determining a similarity value of a first content item of a first content type to a second content item of a second content type, the system comprising at least a processor and a memory, wherein the processor, in execution of one or more executable components, configures the computer system to:

determine a first embedding vector for the first content item for a first embedding space of the first content type;

determine a second embedding vector for the second content item for a second embedding space of the second content type;

identify a predetermined first number of closest items of the first content type to the first content item, each of the first number of closest items of the first content type having an established association to one or more content types of the second content type;

for each of the closest items to the first content item, identify a top content item of the second content type associated with a current closest item;

determine an averaged embedding vector in the second embedding space from embedding vectors of the top content items associated with the closest items to the first content item; and determine a first similarity score between the first content item and the second content item according to a measure of similarity between the averaged embedding vector in the second embedding space and the second embedding vector of the second content item in the second embedding space.

8. The computer system of claim 7, wherein the computer system identifies the predetermined first number of closest items of the first content type to the first content item according to a similarity measure of the first embedding vector for the first content item to a plurality of other embedding vectors in the first embedding space, and selecting the predetermined first number of closest items whose embedding vectors are closest to the embedding vector of the first content item in the first embedding space.

9. The computer system of claim 8, wherein the computer system determines the first similarity score between the first content item and the second content item according to a cosine similarity measure between the averaged embedding vector in the second embedding space and the second embedding vector of the second content item in the second embedding space.

10. The computer system of claim 7, wherein the computer system is further configured to:

identify a predetermined second number of closest items of the first content type associated with the second content item;

determine embedding vectors of the predetermined second number of closest items of the first content type associated with the second content item;

determine an averaged embedding vector into the first embedding space for the second content item according to embedding vectors of the predetermined second number of closest items of the first content type associated with the second content item; and determine a second similarity score between the first content item and the second content item according to a measure of similarity between the averaged embedding vector in the first embedding space and the first embedding vector of the first content item in the first embedding space.

11. The computer system of claim 10, wherein the computer system is further configured to combine the first similarity score and the second similarity score to generate a combined similarity score between the first content item and the second content item.

12. The computer system of claim 11, wherein the computer system is further configured to:

determine whether the combined similarity score between the first content item and the second content item meets or exceeds an overall threshold score; and upon a determination that the combined similarity score meets or exceeds an overall threshold score, establish an association of the first content item to the second content item and an association of the second content item to the first content item.

13. The computer system of claim 12, wherein the first content item type is a text-based content item type and the second content item type is an image-based content item type.

* * * * *